United States Patent [19]
Uematsu et al.

[11] Patent Number: 5,638,413
[45] Date of Patent: Jun. 10, 1997

[54] APPARATUS AND METHOD FOR ESTIMATING CORE PERFORMANCE

[75] Inventors: Mikio Uematsu, Yokohama; Makoto Tsuiki, Tokyo; Tatsuya Iwamoto; Tsuyoshi Nakajima, both of Yokohama, all of Japan

[73] Assignee: Kabushiki Kaisha Toshiba, Kawasaki, Japan

[21] Appl. No.: 493,106

[22] Filed: Jun. 21, 1995

[30] Foreign Application Priority Data

Jun. 21, 1994 [JP] Japan .................................. 6-139040

[51] Int. Cl.$^6$ ................................................ G21C 17/00
[52] U.S. Cl. ................... 376/245; 376/216; 364/551.01; 395/800
[58] Field of Search ................................ 376/215, 216, 376/245, 259; 364/224.3, 224.9, 551.01; 395/11, 200.01, 800, 907

[56] References Cited

U.S. PATENT DOCUMENTS

| | | | |
|---|---|---|---|
| 4,803,039 | 2/1989 | Impink, Jr. et al. | 376/216 |
| 5,023,045 | 6/1991 | Watanabe et al. | 376/216 |
| 5,225,149 | 7/1993 | Banda | 376/259 |
| 5,311,562 | 5/1994 | Palusamy et al. | 376/216 |
| 5,392,320 | 2/1995 | Chao | 376/215 |
| 5,442,555 | 8/1995 | Reifman et al. | 376/215 |

OTHER PUBLICATIONS

T. Hoshino et al., "Load Follow Simulation of Three-Dimensional Boiling Water Reactor Core by PACS-32 Parallel Microprocessor System", *Nuclear Technology* 56: 465-477 (1982).

*Primary Examiner*—Daniel D. Wasil
*Attorney, Agent, or Firm*—Foley & Lardner

[57] ABSTRACT

The present invention relates to a technique for estimating core performance which includes the steps of: dividing a reactor core into a plurality of core portions, each consisting of at least one fuel assembly, then further dividing each of the core portions into segments by planes perpendicular to the axis thereof and allocating a parallel processing apparatus having a plurality of arithmetic processing units, a memory for storing processing data of the arithmetic processing units, and communications circuitry for transferring data with respect to the arithmetic processing units, in a manner such that the arithmetic processing units correspond to the segments of the core. Data on the power distribution for the entire core portion to which a corresponding segment belongs is transferred to each arithmetic processing unit, before each of the arithmetic processing units performs thermal hydraulic calculations. Each of the arithmetic processing units calculates the enthalpy distribution and void fraction of coolant in the segment on the basis of the power distribution data, independently of other arithmetic processing units.

6 Claims, 5 Drawing Sheets

APPARATUS AND METHOD FOR ESTIMATING CORE PERFORMANCE

FIELD OF THE INVENTION

The present invention relates to an apparatus and method for estimating the performance of the core of a nuclear reactor, using factors such as the thermal power distribution within the core and an effective multiplication factor of the core. In particular, it relates to an apparatus and method for numerically estimating core performance whereby factors such as power distribution are calculated in parallel by a large number of arithmetic processing units, dividing the core into a large number of assemblies (portions of the core delimited by vertical planes) and segments (portions of the assemblies, delimited by horizontal planes). The purpose of the present invention is to improve the efficiency of operating arithmetic processing units in parallel.

BACKGROUND OF THE INVENTION

In general, the core of a light water reactor is configured of a number of fuel assemblies. Each fuel assembly is configured of a bundle of a plurality of cylindrical fuel rods. Core coolant water absorbs the fission energy from the fuel rods in the form of thermal energy, as it flows through passageways within the fuel rod bundle. (The flow area associated with a bundle will be called a "channel" hereafter). This energy is sent from an exit of the core to a turbine.

In this case, the enthalpy and the density of the coolant in the channels are determined by the power distribution of the reactor, while the power distribution of the reactor is also determined by the density distribution of the coolant, because the neutron flux distribution is dependent on the coolant density. Therefore, calculations of the power distribution of the core must be solved by including the enthalpy distribution and density distribution of the coolant.

There is no way to directly determine both the power distribution of the reactor and the enthalpy distribution and density distribution of the coolant at the same time, so in the prior art they are determined by repeating the following calculations:

1) An estimate of the power distribution is prepared. An initial value of this estimate could be a uniform power distribution, for example.
2) The enthalpy distribution and density distribution of the coolant are calculated in accordance with the thus assumed power distribution.
3) A neutron diffusion equation in the reactor is solved using the density distribution of the coolant that was obtained in step 2. A new power distribution is obtained from the solution of the neutron diffusion equation.
4) A power distribution estimated by using the calculation of step 2 is compared with the new power distribution obtained by the calculation of step 3. If the two power distributions are the same within an allowable error, it can be concluded that the power distribution calculations have converged and the calculation ends at that point. If they are not the same, the power distribution obtained by step 3 is used as a new estimate of the power distribution and the processing returns to step 2.

The calculations of the enthalpy distribution and density distribution of the coolant in step 2 are called "thermal-hydraulic calculations".

In this calculation, the coolant flow rate in each channel has to be calculated. It depends on factors such as the output power of the fuel assembly associated with the channel, the shape of the inlet orifice if any, and the arrangement of fuel rod spacers. Consequently the flow rate differs for each channel.

The coolant flow rate in each channel is determined by distributing the total coolant to the channels in the core of the reactor in such a manner that the pressure drop between the inlet and the outlet of the channels are equal to each other. Since these calculations are difficult to solve directly, they are carried out by repeating the following calculation steps A to D:

A) An estimate of the flow rate of each channel is prepared. As an initial value of this estimate, the coolant flow rate through the core could be allocated uniformly to all the channels, for example.

B) The enthalpy distribution and density distribution of the coolant are calculated in accordance with the power distribution and the rate of flow given by the calculation of step A.

C) The pressure drop of the coolant in each channel is calculated by using the rate of flow given by the calculation of step A and the enthalpy distribution and density of the coolant given by the calculation of step B.

D) The pressure drops obtained by the calculations of step C are checked to see whether they are the same for all the channels. If they are the same within an allowable error, it is determined that the calculations of the flow rate have ended, and the processing proceeds to the power calculations. If they are not the same, the rate of flow is modified in accordance with a comparison of the pressure drop of each channel and the channel-averaged pressure drop. The processing returns to the calculations of step B, using the modified flow rate allocation as the new estimate of the flow rate allocation.

The calculations of the above steps A to D are performed as part of the thermal-hydraulic calculations of step 2, and they are performed every time the repeated calculations used to obtain the power distribution are performed.

Such power distribution calculations are required frequently during the design and operation of a reactor. For example, it is necessary to estimate the core performance regularly and at a fairly high frequency, to obtain cumulative records of checks on the integrity of fuel and the burning of fuel up to the present within a core that is currently operating, as well as for managing the nuclear fuel materials. In addition, preliminary estimates of core performance are performed fairly often during the drafting of short- and medium-term core operations planning for the start-up of the reactor and the withdrawal of control rods. There is therefore a demand for the development of an apparatus and method that can obtain the power distribution of the core of a reactor even faster.

In the prior art, a method called "characteristic channel model" is used to keep the processing time needed to estimating core performance within the practical limitations by a computer that has only one arithmetic processing unit. In this method, the channels within the core are classified into a number of groups depending on quantities that are peculiar to the channels, such as power magnitude, the shape of the orifices, and the shape of the power distribution in the axial direction. A characteristic channel is defined for each group as a representative, that has quantities averaged over the channels belonging to the group. The flow rate allocation for the characteristic channels is calculated instead of a flow rate allocation for each individual channel. The relationship between a parameter such as the power output within the group to which each channel belongs and the rate of flow is obtained for fitting it to a linear function, and the rate of flow for each channel is calculated on the basis of this function.

Use of this method can reduce the time required for calculating the thermal-hydraulics of a core to approximately 1/25 of the original time required, when all channels are classified to eight characteristic channels.

The improvement in processing speed of the thermal-hydraulics calculation basing on the "characteristic channel model" is limited to one order of magnitude, and it has not been possible in the prior art to produce a further large improvement. It is also not possible with this method to shorten the processing time required for the neutron diffusion calculation part.

To address these defects in the prior art, an apparatus and method for estimating core performance has been proposed by which the core performance is estimated in a parallel manner by a large number of arithmetic processing units, each provided with communications means and a dedicated memory device.

With this apparatus and method, the core of a reactor is divided into a plurality of core portions, each consisting of at least one fuel assembly, each core portion is allocated to one arithmetic processing unit, and the power distribution and thermal-hydraulic calculations are performed by all the arithmetic processing units in parallel.

In this case, spatially continuous neutron diffusion equations and thermal-hydraulic calculations are performed by using the communications means to exchange data on the neutron flux at the boundaries of the core portions and the pressure drop of each channel between the arithmetic processing units, during the analysis of the neutron flux between the core portions and the pressure balance of the coolant between the channels.

In accordance with this prior-art method, the amount of processing performed by one arithmetic processing unit can be reduced to at most the calculation for one fuel assembly, and the load on the arithmetic processing unit can be reduced thereby. Since there are some losses due to the time taken for communications, the processing speed is not necessarily proportional to the number of arithmetic processing units. However, with a one-quarter structure of a light water reactor having 191 channels, for example, the processing speed for calculating both the thermal-hydraulics of the core and neutron diffusion can be increased by two orders of magnitude.

In addition, the allocation of flow to individual channels makes it unnecessary to use a "characteristic channel model" simulation, and the use of the method employing a large number of arithmetic processing units enables an improvement in accuracy over the method using the "characteristic channel model" simulation.

However, the above-described proposed apparatus and method for estimating core performance, implemented by a plurality of arithmetic processing units, is limited in that the core portion corresponding to each arithmetic processing unit is set in units of fuel assemblies, and thus it is impossible to increase the processing speed by a factor of more than two orders of magnitude.

The present invention was devised to solve the above described problems with the prior-art techniques, and has as its objective the provision of an apparatus and method for estimating core performance which is intended to increase the speed and accuracy with which the core performance is estimated, by driving parallel arithmetic processing unit to their maximum limits.

SUMMARY OF THE INVENTION

In order to achieve the above objective, an apparatus for estimating core performance in accordance with the present invention comprises: a plurality of arithmetic processing units, memory means for storing processing data for the arithmetic processing units, and communications means for providing data communications between the arithmetic processing units; wherein:

each of these arithmetic processing units corresponds to a segment that is formed by dividing a core portion consisting of at least one fuel assembly by planes perpendicular to the axis thereof; obtains a power distribution for the entire core portion to which the corresponding segment belongs, via the communications means; and calculates the enthalpy distribution and density distribution of coolant within each segment on the basis of the power distribution, independently of other arithmetic processing units.

This apparatus for estimating core performance preferably repeats the calculations for determining the enthalpy distribution, density distribution, and power distribution of the coolant. During the solving of the following simultaneous equations for the enthalpy distribution $H^{(n)}$ and void fraction $V^{(n)}$ of the coolant within the fuel assembly during and nth iteration of the calculation of the enthalpy distribution and void fraction distribution of the coolant:

$$H^{(n)}=F1(V^{(n)})$$

$$V^{(n)}=F2(H^{(n)})$$

the void fraction distribution $V^{(n-1)}$ of the (n−1)th iteration is substituted into the void fraction distribution $V^{(n)}$ and each of the arithmetic processing units independently calculates the thermal-hydraulics for the corresponding segment by calculating the enthalpy $H^{(n)}(z)$ for each of the segments along the axial direction of the fuel assembly, independently of the void fraction $V^{(n)}(z)$.

A method of estimating core performance in accordance with the present invention comprises the steps of:

dividing a core of a nuclear reactor into a plurality of core portions, each consisting of at least one fuel assembly, then further dividing each of these core portions into segments by planes perpendicular to the axis thereof;

allocating a parallel-processing apparatus comprising a plurality of arithmetic processing units, a memory means for storing processing data of the arithmetic processing units, and communications means for transferring data with respect to the arithmetic processing units, in such a manner that the arithmetic processing units correspond to the segments of the core; and transferring to each arithmetic processing unit data on the power distribution for the entire core portion to which the corresponding segment belongs, before each of the arithmetic processing units calculates a thermal-hydraulic, then causing each of the arithmetic processing units to calculate the enthalpy distribution and density of a coolant in the segment on the basis of the power distribution data, independently of other arithmetic processing units.

This method of estimating core performance preferably repeats the calculations for determining the enthalpy distribution, density distribution, and power distribution of the coolant within the corresponding segment, in a direction in which the power distribution of the core of the reactor converges. During the solving of the following simultaneous equations for the enthalpy distribution $H^{(n)}$ and void fraction $V^{(n)}$ of the coolant within the fuel assembly during an nth iteration of the calculation of the enthalpy distribution and void fraction distribution of the coolant:

$$H^{(n)}=F1(V^{(n)})$$

$$V^{(n)}=F2(H^{(n)})$$

the void fraction distribution $V^{(n-1)}$ obtained by the calculations of the (n–1)th iteration is substituted into void fraction distribution $V^{(n)}$; and the enthalpy $H^{(n)}(z)$ for each of the segments is calculated along the axial direction of the fuel assembly, independently of the void fraction $V^{(n)}(z)$.

DESCRIPTION OF THE PREFERRED EMBODIMENT

For an accurate calculation of the power distribution in the core of a nuclear reactor, it is essential to segment the core in a three-dimensional manner. This makes it possible to configure the system described below as an apparatus for estimating core performance, wherein a core is segmented in a three-dimensional manner to calculate the power distribution thereof.

Figure 5:
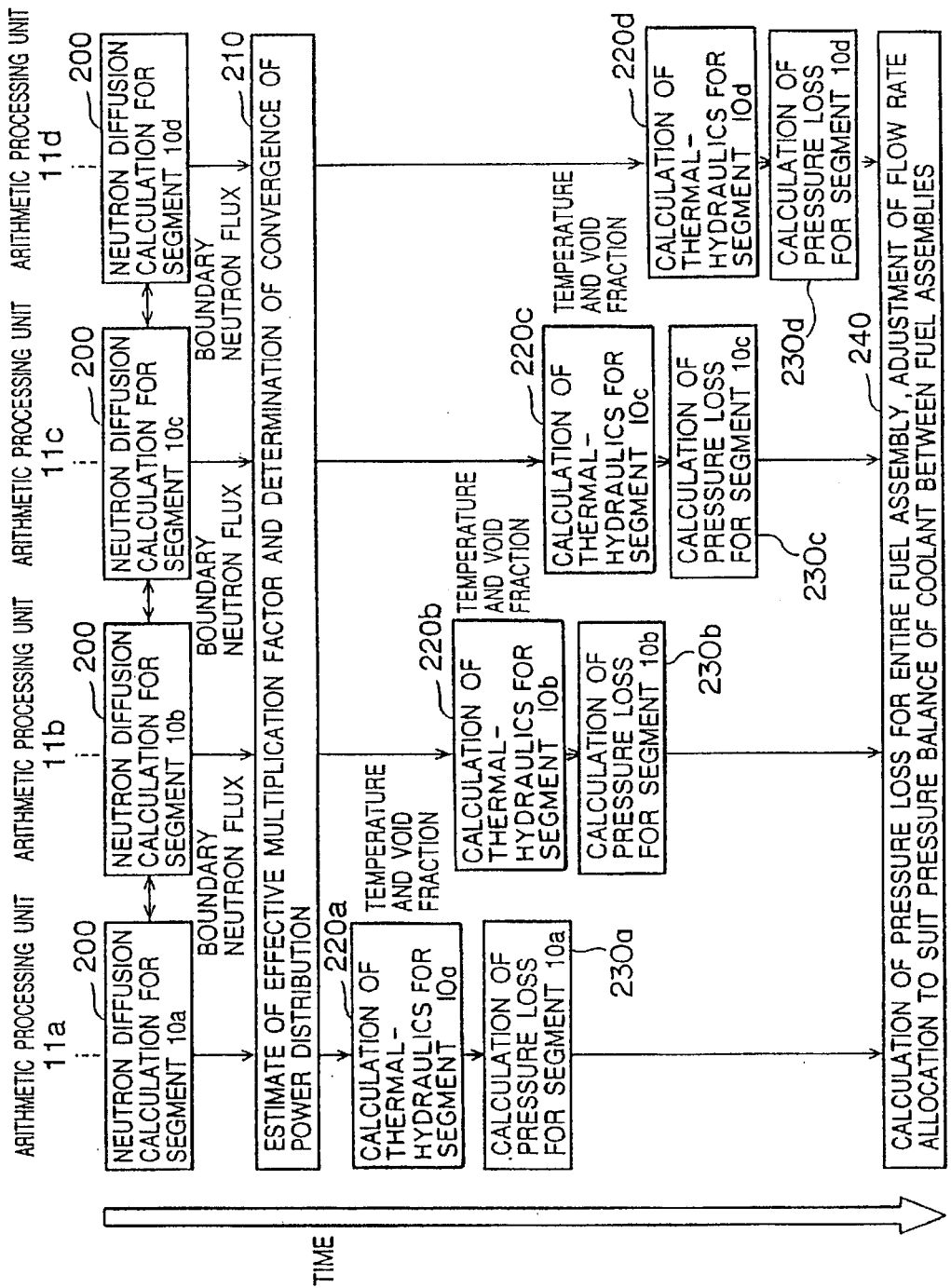
FIG. 5 is a flowchart of the processing performed by the apparatus and method for estimating core performance in accordance with the prior art.

The flow of processing shown in FIG. 5 extends from the (n−1)th iteration of a power distribution calculation to the nth iteration of a thermal-hydraulic calculation, in a prior-art apparatus for estimating core performance whereby the core is divided into a large number of segments in a spatial manner and each segment is made to correspond to a dedicated arithmetic processing unit.

With this apparatus and method for estimating core performance, the core is divided into core portions in fuel assembly units and each core portion is further divided into four segments $10a$ to $10d$ arranged in the axial direction along the fuel assembly. Each of these segments $10a$ to $10d$ is made to correspond to arithmetic processing units $11a$ to $11d$ in such a manner that the arithmetic processing units $11a$ to $11d$ perform all the calculations for the corresponding segments $10a$ to $10d$.

After an (n−1)th iteration of neutron diffusion calculations (step 200) and after the effective multiplication factor is estimated and it is determined whether or not the power distribution has converged (step 210) by this apparatus and method for estimating core performance, calculation of the thermal-hydraulic of the segments $10a$ to $10d$ starts, but the thermal-hydraulic calculations for these segments $10a$ to $10d$ are performed sequentially.

In other words, FIG. 5 shows that the thermal-hydraulic analysis is performed in sequence, starting with the arithmetic processing unit that is in change of the lowest segment. Data on the enthalpy and density of the coolant, which are the results of these calculations, is then passed by the communications means to the arithmetic processing unit in charge of the next segment up (steps 220a to 220d).

As the thermal-hydraulic calculation ends for each segment, the corresponding pressure drop is calculated (steps 230a to 230d). When the pressure drop calculations have been completed for all the segments, the pressure drop and flow rate allocation of the entire fuel assembly are calculated (step 240).

The above described apparatus and method for estimating core performance is capable of reducing the amount of processing performed by each arithmetic processing unit.

In other words, the neutron diffusion calculations are performed by dividing the core into units of fuel assemblies and then dividing these portions into a plurality of segments in the axial direction in a similar manner. Since the neutron diffusion of each segment is calculated independently, the time required for the arithmetic processing units to communicate with each other is increased to a certain extent by the exchange of boundary neutron flux information, but an increase in processing speed that is substantially proportional to the number of arithmetic processing units can be expected.

However, the increase in processing speed for the thermal-hydraulic calculations is not proportional to the number of arithmetic processing units. With the above-described apparatus and method for estimating core performance, if one channel is divided into four segments arranged in the axial direction thereof, it should be clear from FIG. 5 that the arithmetic processing unit in charge of the second segment from the bottom starts performing the thermal-hydraulic analysis for the segment allocated to it after it has received data such as the enthalpy and density of the coolant when the arithmetic processing unit in charge of the lowest segment has completed its thermal-hydraulic analysis. Similarly, the analysis for each of the third and fourth segments from the bottom starts after waiting for the calculations to end for the previous segment. This means that, even though the calculation load for the thermal-hydraulic calculations has been divided between a plurality of arithmetic processing units, the processing time is exactly the same as in the case in which the load is not divided, and it might even be delayed further if the time required for communications is considered.

A preferred embodiment of the present invention is described below, with reference to the accompanying diagrams.

Figure 1:
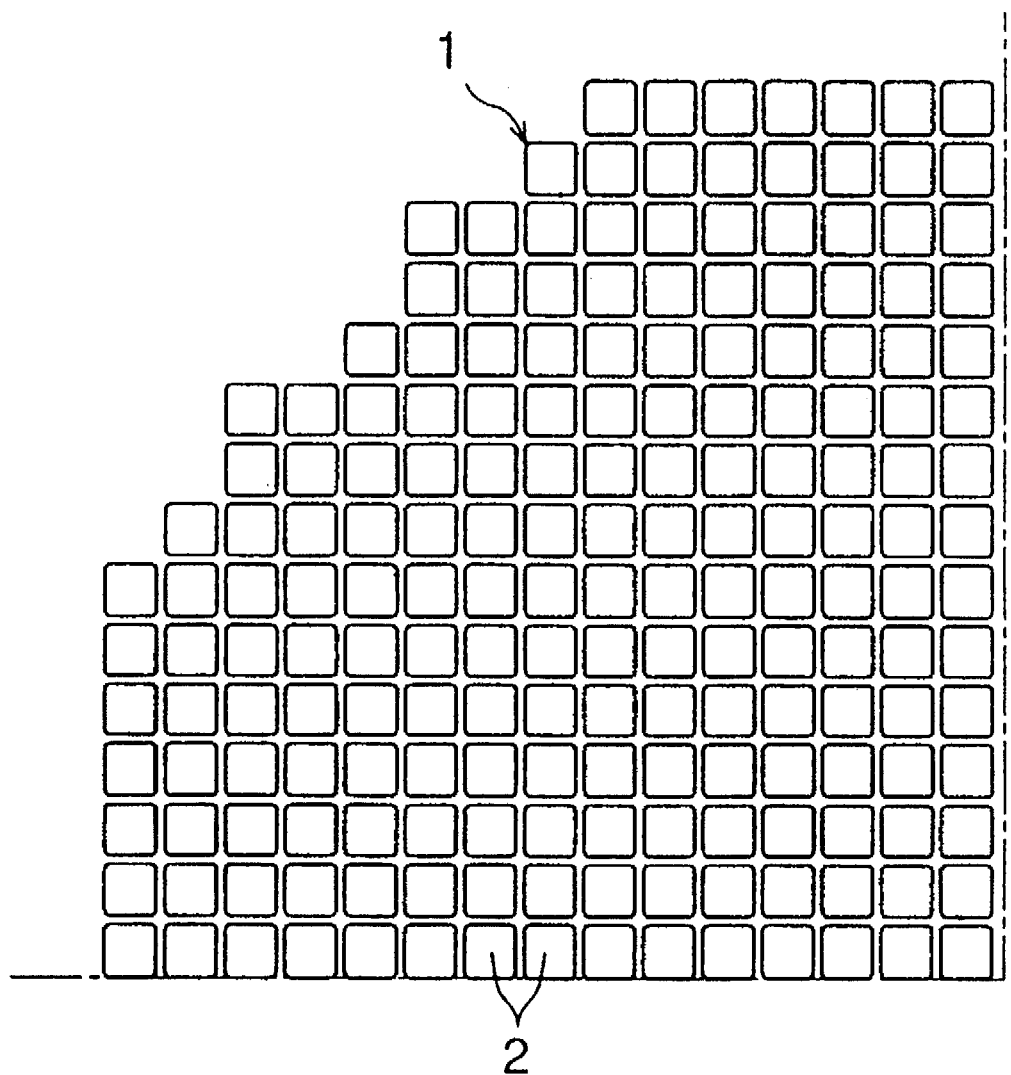
FIG. 1 is a plan view of a one-quarter structure of the core of a nuclear reactor.

A one-quarter structure of the core of a light water reactor is shown in FIG. 1. This quarter of the core 1 comprises 191 fuel assemblies 2.

With the apparatus and method for estimating core performance in accordance with the present invention, the core 1 is divided into a number of segments in a spatial manner. It is preferable that the core 1 is divided into a large number of core portions arranged parallel along the axis of the core 1, each core portion consisting of at least one fuel assembly 2, and each core portion is further divided into a plurality of segments arranged in the axial direction of the fuel assemblies 2. Since the minimum size of a core portion is one fuel assembly 2, the one-quarter structure of the core 1 shown in FIG. 1 can be divided into a maximum of 191 core portions. The description of this embodiment below concerns a configuration in which one fuel assembly 2 is further divided into four segments for parallel processing.

Figure 2:
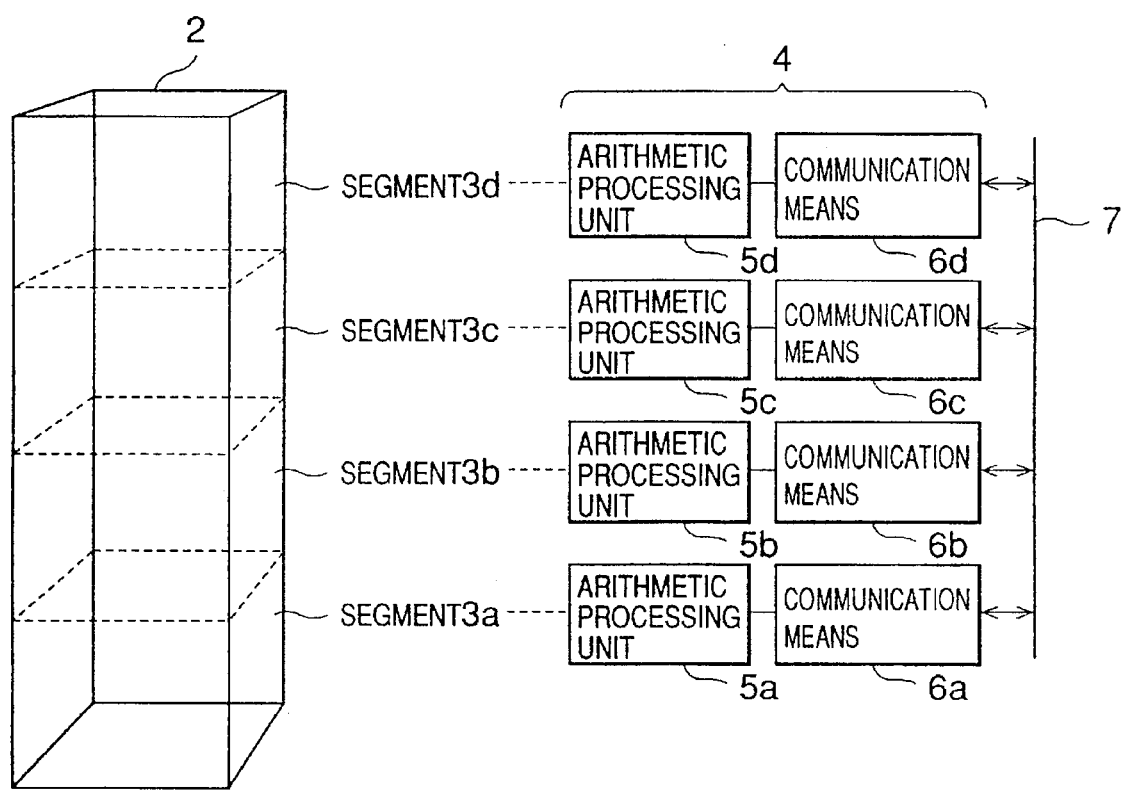
FIG. 2 is a view of an example wherein a core is divided into a large number of segments which are made to correspond to arithmetic processing units of the apparatus for estimating core performance in accordance with the present invention.

An example wherein the core is divided into a large number of segments and the apparatus for estimating core performance is made to correspond thereto is shown in FIG. 2. In this embodiment, the core 1 is divided into core portions each consisting of one fuel assembly 2, and each fuel assembly 2 is further divided into four segments 3a, 3b, 3c, and 3d in the direction perpendicular to the axis thereof.

Reference number 4 denotes a part of the apparatus for estimating core performance in accordance with this embodiment. This apparatus for estimating core performance 4 has arithmetic processing units 5a to 5d corresponding to the segments 3a to 3d, each of the arithmetic processing units 5a to 5d is provided with communications means 6a to 6d, and the arithmetic processing units 5a to 5d are connected to the communications means 6a to 6d by a communications bus 7.

Note that the apparatus for estimating core performance 4 has a sufficient number of arithmetic processing units 5 and communications means 6 to correspond to all the segments in the entire core. The apparatus is also provided with a memory device for temporarily storing data that is to be processed by the arithmetic processing units 5. Each of the arithmetic processing units 5 is in charge of calculating the thermal-hydraulics and power distribution of the corresponding segment 3, with the configuration being such that the calculation results therefrom can be mutually exchanged via the communications means 6 and the communications bus 7.

The description now turns to the flow of core performance estimation processing with this apparatus for estimating core performance 4.

Figure 3:
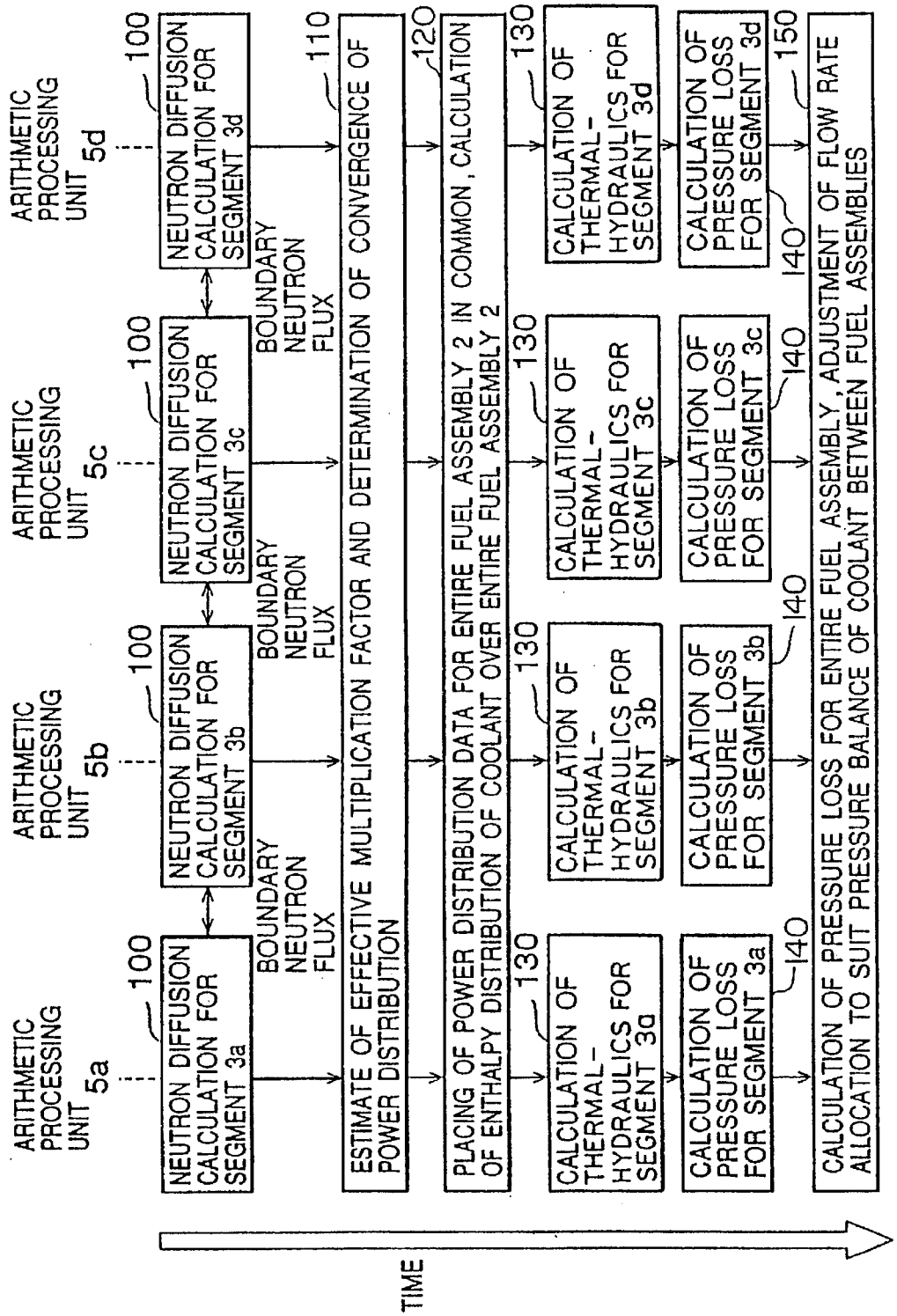
FIG. 3 is a flowchart of the processing performed by the apparatus and method for estimating core performance in accordance with the present invention.

The flow of calculating pressure drops within the channel for the first iteration of the flow rate allocation calculations by the arithmetic processing units 5a to 5d is shown in FIG. 3, at the stage at which the (n−1)th iteration of the power distribution calculations has ended and the nth iteration of the thermal-hydraulic calculations has started.

The flow of this core performance estimation process is such that the arithmetic processing units 5a to 5d calculate the neutron diffusion for the corresponding segments 3a to 3d (step 100), then they estimate the effective multiplication factor and determine whether the power distribution has converged (step 110), during the (n−1)th iteration of the power distribution calculations. An example of the method used to calculate the power distribution is given in "Summary of Three-Dimensional Nuclear Boiling-Water Power Calculation Codes for Light Water Reactor Power Generation Stations", published by Toshiba, September 1966.

At the point at which this (n−1)th iteration of the power distribution calculations ends, the communications means 6a to 6d ensure that each of the arithmetic processing units 5a to 5d has in common not only data on the power distribution for the corresponding segments 3a to 3d, but also data for the entire core portion that those segments belong to (in this case, the fuel assembly 2). The enthalpy over the entire fuel assembly 2 is calculated on the basis of this power distribution (step 120). In this case, since the data necessary for the enthalpy calculation (more specifically, the power outputs) has already been distributed between the various arithmetic processing units, there is no particular need to transfer data between these devices and thus each arithmetic processing unit can calculate the enthalpy independently.

Note that the arithmetic processing units 5a to 5d do not calculate the enthalpy for the corresponding segments alone; each arithmetic processing unit calculates the enthalpy for the entire region extending from the channel inlet of the fuel assembly 2 up to its corresponding segment. This is because the enthalpy is calculated in an integrating manner from the inlet of the channel; it cannot be calculated in parallel for each segment. However, this calculation is far simpler and also takes less time than the calculations of densities and pressure drops, which will be described later, and thus it does not hinder the increase in processing speed provided by the use of parallel processing of the arithmetic processing units.

The amount of enthalpy ΔH received by the coolant is derived from the heat quantity ΔHf received from the core fuel, the increase in heat quantity ΔHw concomitent with the gamma heating caused by neutron scattering and deceleration within the coolant, the heat quantity ΔHc received from components such as channel boxes and control rods, and the heat quantity ΔHB escaping from the channel boxes. It is expressed as follows:

$$\Delta H = \Delta Hf + \Delta Hw + \Delta Hc - \Delta HB$$

In this case, the heat quantity ΔHw within the coolant is proportional to the density of the coolant. If the coolant is boiling, this heat quantity is calculated by multiplying the heat quantity ΔHw0 in the liquid phase of the coolant by a coefficient that includes the void fraction V, as follows:

$$\Delta Hw = \Delta Hw0 \times (1-V)$$

The void fraction V is a function of the enthalpy H and pressure P of the coolant. The rate of flow is first obtained on the basis of the liquid enthalpy, and the void fraction V is then calculated from the Dix relationship that links this rate of flow to the void fraction (as stated in an example quoted in the above mentioned Summary).

Thus, if the enthalpy of the coolant can be calculated accurately, the following simultaneous equations can be solved for the void fraction:

$$H^{(n)} = F1(V^{(n)})$$

$$V^{(n)} = F2(H^{(n)})$$

where $H^{(n)}$ and $V^{(n)}$ are the enthalpy distribution and void fraction distribution obtained by the nth iterations of the enthalpy distribution and void fraction distribution calculations, respectively.

In contrast, the present invention calculates the enthalpy distribution $H^{(n)}(z)$ and void fraction $V^{(n)}(z)$ for each segment independently, by substituting a void fraction $V^{(n-1)}$ which is the result of the (n−1)th iteration of the calculations into the void fraction $V^{(n)}$.

Alternatively, the enthalpy distribution $H^{(n)}(z)$ can be calculated based on density instead of void fraction. In this technique, the density distribution $D^{(n-1)}$ is substituted as density distribution, $D^{(n)}$ such that the enthalpy $H^{(n)}(z)$ is calculated independently of density $D^{(n)}(z)$ during calculation of the following simultaneous equations:

$$H^{(n)} = F3(D^{(n)})$$

$$D^{(n)} = F4(H^{(n)})$$

This process makes it possible for the method of estimating core performance of this embodiment to isolate the enthalpy calculations.

Since the enthalpy ΔHw contributed by the void fraction when this method is used does not exceed 2% to 3% of the total change in enthalpy ΔH, it is small enough that any error caused by using the result of the previous iteration of the calculations as the void fraction can be ignored.

Once this enthalpy calculation is completed, the arithmetic processing units 5a to 5d then calculate the density and pressure drop for the corresponding segments 3a to 3d, in parallel and independently steps 130 and 140).

This calculation of void fraction independently for each segment ensures that the void fraction can be obtained uniquely from the reactor pressure and the coolant temperature by obtaining the enthalpy.

Therefore, the calculation of the void fraction of each segment makes it possible to analyze the thermal-hydraulics of that segment, without needing to receive physical data from the arithmetic processing unit in charge of the upstream segment.

In addition, each of the arithmetic processing units is capable of independently calculating pressure drops for the corresponding segment, using orifice and fuel rod spacer data on the fuel assemblies to which is added the temperature of the coolant and the void fraction as input data.

Once the pressure drop for each of the segments 3a to 3d has been obtained, the pressure drop for the entire fuel assembly 2 is calculated (step 150). This pressure drop per channel can be obtained by using the communications means 6 to exchange pressure drops calculated for each of the segments and adding them over the entire length of the fuel assembly 2.

The pressure drops calculated for each of the fuel assemblies 2 are then compared and the rates of flow are allocated according to the pressure balance of the coolant between the fuel assemblies (step 150).

Figure 4A:
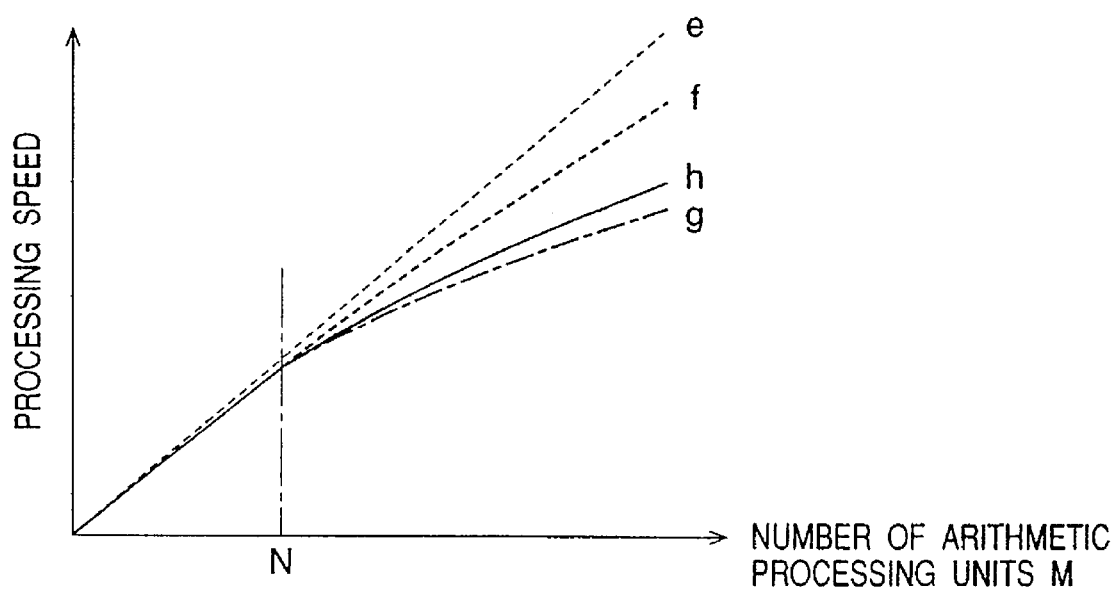
FIGS. 4a and 4b are graphs of the relationship between number of arithmetic processing units and processing speed, in apparatus and methods for estimating core performance in accordance with the present invention and the prior art.
Figure 4B:
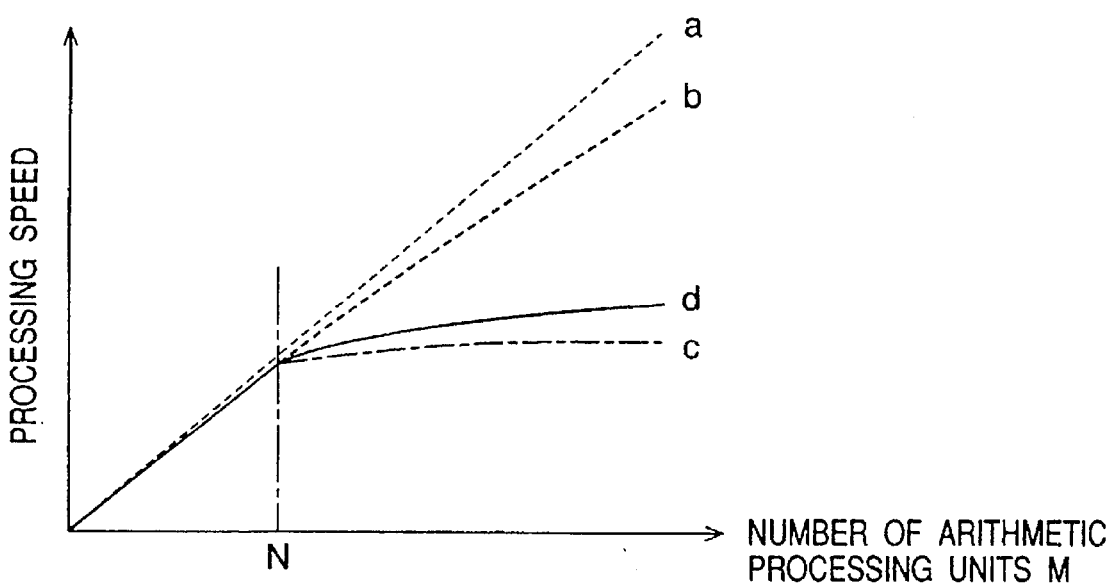

Graphs of the numbers and processing speeds of arithmetic processing units implementing the apparatus and method for estimating core performance in accordance with the present invention are shown in FIG. 4, in comparison with those of the prior art. In other words, FIG. 4a shows the apparatus and method for estimating core performance of the present invention and FIG. 4b shows a prior art apparatus and method that performs each segment calculation in sequence.

In these graphs, N is the number of fuel assemblies and M is the number of arithmetic processing units. It is clear that if M≦N, the core is divided into core portions in fuel-assembly units; if M>N, the core portions are further divided into a plurality of segments.

A line 'e' in FIG. 4a shows an ideal case in which the processing speed increases in direct proportion to the number of arithmetic processing units. A curve 'f' shows the relationship between the number of arithmetic processing units and processing speed when the apparatus and method for estimating core performance of the present invention is used for power distribution calculations. Similarly, a curve 'g' shows the relationship between the number of arithmetic processing units and processing speed for thermal-hydraulic calculations. It is clear from this figure that, although delays due to factors such as data transfer cause the curves to deviate downward from the line 'e' representing the ideal processing speed, both curves demonstrate a continuous rise processing speed as the number of arithmetic processing units increases.

Therefore, the overall processing speed also increases with the number of arithmetic processing units, as shown by a curve 'h'.

In contrast, FIG. 4b shows the equivalent curves for the prior-art case in which the calculations for each segment are performed sequentially. A line 'a' shows the ideal increase in processing speed as the number of arithmetic processing units increases. In comparison thereto, the processing speed of the power distribution calculations shown by a line 'b' certainly rises in proportion to the increase in the number of arithmetic processing units. However, no effect is seen on the processing speed for the thermal-hydraulic calculations as the number of arithmetic processing units increases, as shown by a curve 'c'. This means that the overall effect on the processing speed as the number of arithmetic processing units increases is small, as shown by a curve 'd'.

A comparison of FIG. 4a and FIG. 4b makes it clear that the apparatus and method for estimating core performance in accordance with the present invention can enable an increase in the processing speed by improving the performance of parallel processing by a large number of arithmetic processing units and increasing the number of arithmetic processing units.

As should be clear from the above description, the apparatus and method for estimating core performance in accordance with the present invention makes it possible to obtain the effects of parallel processing of arithmetic processing units and increase the processing speed as the number of the arithmetic processing units increases, in comparison with an apparatus and method for estimating core performance in accordance with the prior art in which processing is performed sequentially and has to wait until the enthalpy calculation for the upstream segment has ended.

During the nth iteration of the calculation of the enthalpy $H^{(n)}$, the substitution of the void fraction $V^{(n-1)}$ of the (n−1)th iteration removes the need for the apparatus and method for estimating core performance to solve the simultaneous equations for enthalpy distribution and void fraction distribution. This makes it possible to obtain an apparatus and method for estimating core performance with a shorter processing time.

The present invention has been described above with reference to one embodiment thereof, but it should be clear to those skilled in the art that various different variations and modifications can be made within the spirit of the present invention and the range of the claims thereof.

What is claimed is:

1. An apparatus for estimating core performance, comprising a plurality of arithmetic processing units, a memory means for storing processing data for said arithmetic processing units, and communications circuitry means for providing data communications between said arithmetic processing units; wherein:

each of said arithmetic processing units corresponds to a segment that is formed by dividing a core portion consisting of at least one fuel assembly by planes perpendicular to the axis thereof; obtains a power distribution for the entire core portion to which said corresponding segment belongs, via said communications circuitry; and calculates the enthalpy distribution, density distribution and void fraction distribution of coolant within each segment on the basis of said power distribution, independently of other arithmetic processing units.

2. An apparatus for estimating core performance according to claim 1, wherein said apparatus of estimating core performance repeats the calculations for said enthalpy distribution, density distribution and void fraction distribution of said coolant; substitutes a void fraction distribution $V^{(n-1)}$ of an (n−1)th iteration into a void fraction distribution $V^{(n)}$ during the calculation of the following simultaneous equations for enthalpy distribution $H^{(n)}$ and void fraction distribution $V^{(n)}$ of said coolant within said calculations of said enthalpy distribution and void fraction distribution of said coolant:

$$H^{(n)} = F1(V^{(n)})$$

$$V^{(n)}=F2(H^{(n)})$$

and each of said arithmetic processing units independently perform thermal hydraulic calculations for said corresponding segment by calculating enthalpy $H^{(n)}{}_{(z)}$ for each of said segments along the axial direction of said fuel assembly, independently of void fraction $V^{(n)}(z)$.

3. An apparatus for estimating core performance according to claim 1, wherein said apparatus for estimating core performance repeats the calculations of said enthalpy distribution and density distribution of said coolant; substitutes a density distribution $D^{(n-1)}$ of an (n−1)th iteration into a density distribution $D^{(n)}$ during the calculation of the following simultaneous equations for enthalpy distribution $H^{(n)}$ and density distribution $D^{(n)}$ of said coolant within said calculations of said enthalpy distribution and density distribution of said coolant:

$$H^{(n)}=F3(D^{(n)})$$

$$D^{(n)}=F4(H^{(n)})$$

and each of said arithmetic processing units independently perform thermal hydraulic calculations for said corresponding segment by calculating enthalpy $H^{(n)}(z)$ for each of said segments along the axial direction of said fuel assembly, independently of density $D^{(n)}(z)$.

4. A method of estimation core performance, comprising the steps of:

dividing a reactor core into a plurality of core portions, each consisting of at least one fuel assembly, then further dividing each of said core portions into segments by planes perpendicular to the axis thereof;

allocating a parallel processing apparatus comprising a plurality of arithmetic processing units, a memory for storing processing data of said arithmetic processing units, and communications circuitry for transferring data with respect to said arithmetic processing units, in such a manner that said arithmetic processing units correspond to said segments of said core; and transferring to each arithmetic processing unit data on the power distribution for the entire core portion to which the corresponding segment belongs, before each of said arithmetic processing units performs thermal hydraulic calculation, then causing each of said arithmetic processing units to calculate the enthalpy distribution, density distribution and void fraction distribution of a coolant in said segment on the basis of said power distribution data, independently of other arithmetic processing units.

5. A method of estimating core performance according to claim 4, wherein calculations for determining said enthalpy distribution, void fraction distribution of said coolant, and power distribution within said corresponding segment are repeated in a direction in which the power distribution of the core of the reactor converges;

a void fraction distribution $V^{(n-1)}$ of an (n−1)th iteration is substituted into a void fraction distribution $V^{(n)}$ during the calculation of the following simultaneous equations for the enthalpy distribution $H^{(n)}$ and void fraction distribution $V^{(n)}$ of said coolant within said fuel assembly in an n-th iteration of said calculations of said enthalpy distribution and void fraction distribution of said coolant:

$$H^{(n)}=F1(V^{(n)})$$

$$V^{(n)}=F2(H^{(n)})$$

and ethalpy $H^{(n)}(z)$ for each of said segments is calculated along the axial direction of said fuel assembly, independently of void fraction $V^{(n)}(z)$.

6. A method of estimating core performance according to claim 4, wherein calculations for determining said enthalpy distribution, density distribution of said coolant, and power distribution within said corresponding segment are repeated in a direction in which the power distribution of the core of the reactor converges;

a density distribution $D^{(n-1)}$ of an (n−1)th iteration is substituted into a density distribution $D^{(n)}$ during the calculation of the following simultaneous equations for the enthalpy distribution $H^{(n)}$ and the density distribution $D^{(n)}$ of said coolant within said fuel assembly in an n-th iteration of said calculations of said enthalpy distribution and density distribution of said coolant:

$$H^{(n)}=F3(D^{(n)})$$

$$D^{(n)}=F4(H^{(n)})$$

and enthalpy $H^{(n)}(z)$ for each of said segments is calculated along the axial direction of said fuel assembly, independently of density $D^{(n)}{}_{(z)}$.

* * * * *